US007552226B2

(12) United States Patent
Doering et al.

(10) Patent No.: US 7,552,226 B2
(45) Date of Patent: Jun. 23, 2009

(54) DETECTING A TIMEOUT OF ELEMENTS IN AN ELEMENT PROCESSING SYSTEM

(75) Inventors: Andreas Ch. Doering, Adliswil (CH); Silvio Dragone, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 11/100,157

(22) Filed: Apr. 6, 2005

(65) Prior Publication Data

US 2005/0268144 A1 Dec. 1, 2005

(30) Foreign Application Priority Data

Apr. 8, 2004 (EP) .................................. 04008568

(51) Int. Cl.
*G06F 15/16* (2006.01)
(52) U.S. Cl. ...................................... 709/230; 713/502
(58) Field of Classification Search .................. 709/230, 709/235; 713/502; 370/230, 231; 708/490, 708/508
See application file for complete search history.

(56) References Cited

U.S. PATENT DOCUMENTS

| 5,555,266 | A | * | 9/1996 | Buchholz et al. | ............ 370/347 |
| 5,706,425 | A | * | 1/1998 | Unekawa | ...................... 714/55 |
| 5,838,957 | A | * | 11/1998 | Rajaraman et al. | .......... 713/502 |
| 6,647,505 | B1 | * | 11/2003 | Dangi et al. | ................. 703/502 |
| 6,763,476 | B1 | * | 7/2004 | Dangi et al. | ................. 713/502 |
| 6,823,467 | B1 | * | 11/2004 | Cantrill | ...................... 713/600 |
| 6,891,834 | B1 | * | 5/2005 | Dally et al. | .............. 370/395.4 |
| 7,050,940 | B2 | * | 5/2006 | Basso et al. | ................. 702/184 |
| 2003/0172314 | A1 | * | 9/2003 | Walter | ........................ 713/502 |
| 2004/0039956 | A1 | * | 2/2004 | Li | ............................... 713/502 |

FOREIGN PATENT DOCUMENTS

CN 1545308 * 11/2004

OTHER PUBLICATIONS

May et al., IEEE Standard for Binary Floating-Point Arithmetic, Mar. 21, 1985, IEEE Std. 754-1985, pp. 3-6.*
Prijono, Benny; Timer Heap Management, Jul. 2008, http://www.pjsip.org/pjlib/docs/html/group__PJ_TIMER.htm, pp. 1-5.*

* cited by examiner

*Primary Examiner*—Nathan J Flynn
*Assistant Examiner*—James E Conaway
(74) *Attorney, Agent, or Firm*—Vazken Alexanian

(57) ABSTRACT

Provides methods, systems and apparatus for timer management of an element processing system wherein timer intervals related to elements to be processed can be handled in a time-efficient manner. An example method is a method for detecting a timeout of elements in an element processing system wherein a timer value, indicating a timeout interval with respect to a given time base, is assigned to each of the elements when processed. From a number of elements processed, the timer value indicating a minimum timeout interval to expire is determined out of the number of timer values assigned to the number of elements being processed.

1 Claim, 4 Drawing Sheets

DETECTING A TIMEOUT OF ELEMENTS IN AN ELEMENT PROCESSING SYSTEM

FIELD OF THE INVENTION

The present invention is related to a method for detecting a timeout of elements in an element processing system. More particularly for detecting a timeout of packets in a packet-based transmission system. Furthermore, the present invention is related to a element processing system, particularly to a packet-based transmission system which is adapted to transmit a number of data packets.

BACKGROUND OF THE INVENTION

In a packet-based transmission system, a large number of timers are frequently used in networking protocol processing and protocol termination applications purposes. One example is the retransmission timer of the transmission control protocol (TCP) or of the stream control transmission protocol (SCTP). Therein, an element or a packet will be retransmitted when no acknowledgement for a receiving of a particular packet has been received within the specified timeout interval (RTO). Thus, for each of the data packets being transmitted a dedicated timeout interval (RTO) is assigned. The timeout interval depends on the connection and link characteristics and can vary between multiple 10 milliseconds up to several tens of seconds. When the timeout interval for a packet has expired, a timeout event occurs wherein a special handling is invoked.

The handling of the timeout intervals of each transmitted packet is conventionally handled by software. The software finds the appropriate packet and connection to do the retransmission. To each of the packets being transmitted, one timer is associated.

Such software basically performs three basic operations. When a packet is transmitted for the first time, a timer is initialized with the timeout interval. The timer is normally realized by a memory position wherein a value is stored which represents the timeout interval. The value stored is relative to a time base wherein the difference between the time base value and the timeout interval stored corresponds to the timer value. When the acknowledgement for this packet is received before the timeout interval has passed, the timer is cleared. The timer can now be used for a different packet that has no further association with the before transmitted packet. If the timeout interval expires before an acknowledgement of receipt has been received, the software invokes a special handling regarding the respective data packet e.g. in order to retransmit the packet or react otherwise, e.g. by reporting an error. The same timer can be used for the re-transmission but it is reinitialized with the same or a different timeout interval.

Today almost all network protocol implementations use software solutions to manage the timers, but with increasing numbers of timers to be managed by software, the excess delay grows almost exponentially. Software timer management is for example disclosed in the document "Hashed Hierarchical Timing Wheels: Efficient Data Structures for Implementing a Timer Facility", by George Varghese, Anthony Lauck, IEEE/ACM Transactions on Networking, 1997.

Another known solution is to delegate the timing function of the timer manager from software timer to hardware timers into a so-called co-processor including a number of hardware-implemented timers. This is disclosed in the document "A Hardware/Software Codesign Strategy for the Implementation of High-Speed Protocols" by Marco Heddes, Technical University Eindhoven, 1995. Hardware co-processors are less flexible than the software solution. The latency in such a design is large because of the number of external memory accesses.

In a software solution, timer values indicating timeout intervals for each of the transmitted packets are stored in a linked list wherein each member of the list has a reference to a succeeding and a following member of this list, except it is the first or last member of the list. The list is sorted from a minimum timeout interval to a maximum timeout interval wherein each new timer value to be added is included into the list as soon as the packet has been transmitted, and therefore the timer is set. The inclusion of the respective timer value to be set is time-consuming as the respective timer value is compared with the timer values present in the linked list. The position of the timer value to be inserted is defined such that the preceding element of the link list represents a smaller timer value and wherein the following element of the link list represents a timer value which is higher than the timer value to be inserted or vice versa. This method is time-consuming.

SUMMARY OF THE INVENTION

Therefore, it is an object of the present invention to provide methods, systems and apparatus for providing a timer management of an element processing system wherein timer intervals related to elements to be processed can be handled in a time-efficient manner. According to a first aspect of the present invention, a method for detecting a timeout of elements in an element processing system is provided. A timer value, indicating a timeout interval with respect to a given time base, is assigned to each of the elements when processed. In a number of elements which are processed or have been processed, the timer value indicating the minimum timeout interval to expire is determined out of the number of timer values assigned to the number of elements being processed. It is detected if the determined timer value has expired to determine the timeout of the assigned element. The determining of the timer value is performed in a number of stages arranged in a cascade and having a first, preceding stage and a last, succeeding stage. In the first stage, the number of timer values is divided up into timer value sets, each containing a number of timer values. For each of the timer value sets, a minimum timer value is determined having a minimum timeout interval of any other timer values. The minimum timer values for each of the timer value sets are provided to a next stage. In the last stage, the overall minimum timer value of the provided minimum timer values of a succeeding stage is determined.

According to another embodiment of the present invention, one or more intermediate stages are provided, wherein the number of the provided timer values from the respectively preceding stage is divided up into respective timer value sets, each having a number of the provided timer values. For each of the respective timer value sets, a respective timer value is determined having the minimum timeout interval of any of the provided timer values of the respective timer value set. The determined timer values of the respective intermediate stage are provided to a succeeding stage. According to this embodiment, more than two stages may be provided to find out the overall minimum timer value of all active timer values. By cascading the process of finding the timer value indicating the minimum timeout interval can be remarkably increased performing the process of determining of the minimum timer value in smaller groups and recursively processing the respective results until an overall minimum timer value is determined indicating the minimum timeout interval to expire.

According to another aspect of the present invention, an element processing system for detecting a timeout of elements being processed is provided. The element processing system comprises a processing unit for processing elements and for assigning a timer value indicating a timeout interval to each of the elements when processed and a time managing controller for determining the timer value indicating the overall minimum timeout interval to expire out of the number of timer values assigned to the number of packets being processed. The element processing system further comprises a timer unit for receiving a provided overall minimum timer value and for detecting if the provided timer value has expired to detect the timeout of the assigned packet.

According to another embodiment of the present invention, a element processing system is provided wherein the time-managing controller further comprises one or more third timer value manager units, each arranged as one intermediate stage respectively, comprising a third means for dividing up the number of timer values provided from the succeeding intermediate or first stage into respective timer value sets each containing a number of timer values and third means for determining the respective minimum timer value having the minimum timeout interval of any of the respective timer values for each of the respective timer value sets and for providing the respective minimum timer values of each of the respective timer value sets to the next intermediate or last stage.

BRIEF DESCRIPTION OF THE DRAWINGS

The objects, features, and advantages of the present invention will become more apparent from the following detailed description when taken in conjunction with the accompanying drawings, in which.

DETAILED DESCRIPTION OF THE INVENTION

Figure 1:
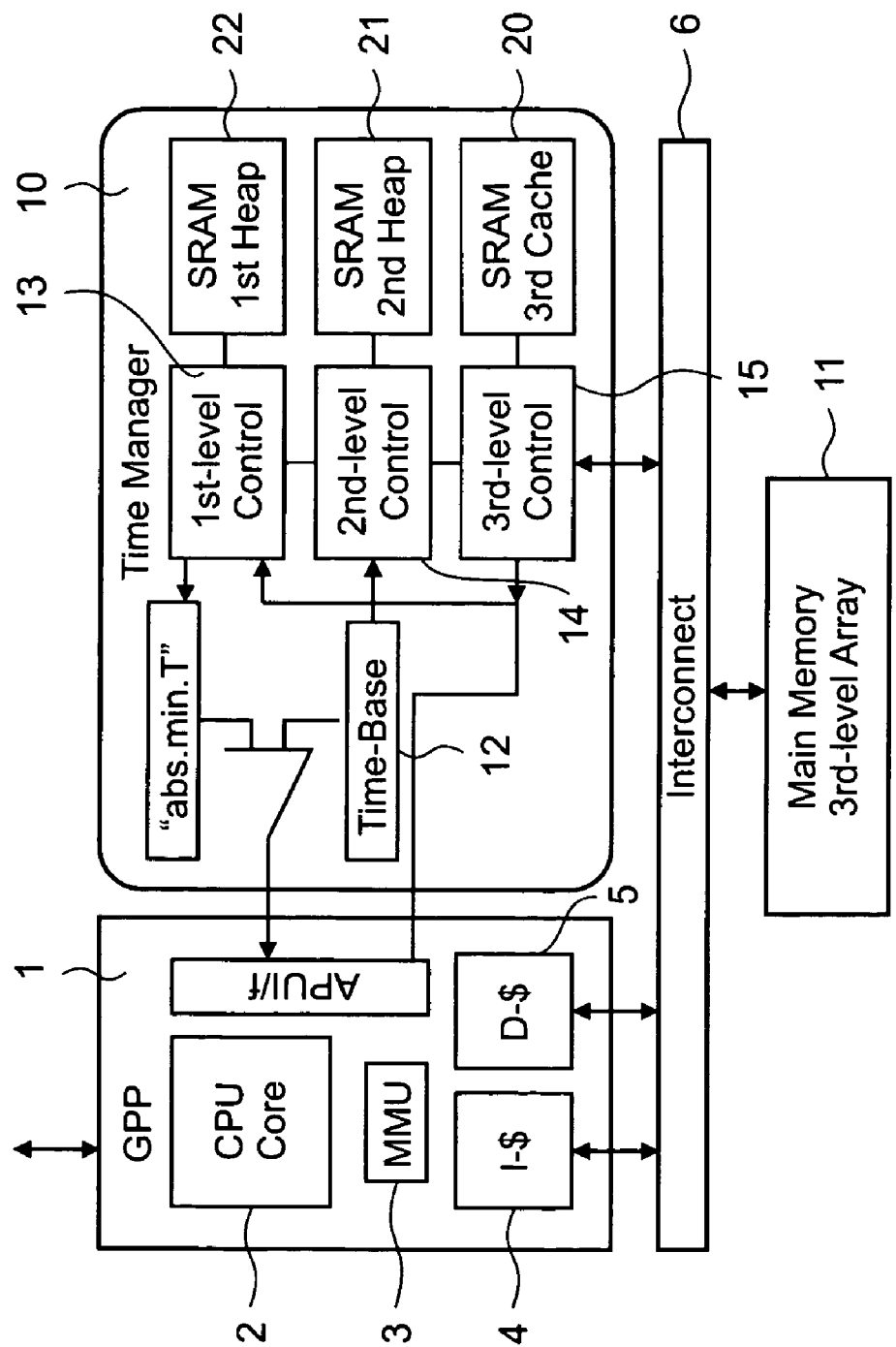
FIG. 1 shows a block diagram of a packet-based transmission system according to a first embodiment of the present invention.

The present invention provides methods, systems and apparatus for providing a timer management of an element processing system wherein timer intervals related to elements to be processed can be handled in a time-efficient manner. According to a first embodiment of the present invention, a method for detecting a timeout of elements in an element processing system is provided. A timer value, indicating a timeout interval with respect to a given time base, is assigned to each of the elements when processed. In a number of elements which are processed or have been processed, the timer value indicating the minimum timeout interval to expire is determined out of the number of timer values assigned to the number of elements being processed. It is detected if the determined timer value has expired to determine the timeout of the assigned element.

The determining of the timer value is performed in a number of stages arranged in a cascade and having a first, preceding stage and a last, succeeding stage. In the first stage, the number of timer values is divided up into timer value sets, each containing a number of timer values. For each of the timer value sets, a minimum timer value is determined having a minimum timeout interval of any other timer values. The minimum timer values for each of the timer value sets are provided to a next stage. In the last stage, the overall minimum timer value of the provided minimum timer values of a succeeding stage is determined.

The method of the present invention has the advantage that the timer value having a minimum timeout interval can be found in a time-efficient manner, so that system resources can be saved. The determining of the respective timer value is performed in a number of stages which are arranged as a cascade. To each stage a number of timer values is input wherein in the respective stage an algorithm is performed to find out a number of timer values indicating the minimum timeout interval. As the number of timer values in one of the respective timer value set is smaller than the overall number of timer values, the determining algorithm can be performed faster. Each of the timer value sets of one stage provide the respective minimum timer value to the succeeding stage, wherein substantially the same process is carried out.

According to another embodiment of the present invention, one or more intermediate stages are provided, wherein the number of the provided timer values from the respectively preceding stage is divided up into respective timer value sets, each having a number of the provided timer values. For each of the respective timer value sets, a respective timer value is determined having the minimum timeout interval of any of the provided timer values of the respective timer value set. The determined timer values of the respective intermediate stage are provided to a succeeding stage. According to this embodiment, more than two stages may be provided to find out the overall minimum timer value of all active timer values. By cascading the process of finding the timer value indicating the minimum timeout interval can be remarkably increased performing the process of determining of the minimum timer value in smaller groups and recursively processing the respective results until an overall minimum timer value is determined indicating the minimum timeout interval to expire.

It can be provided that the elements are data packets and the element processing system is a packet-based transmission system. The timer value is then assigned to each of the packets when transmitted.

Every time one packet has been transmitted, the timer value assigned to the one packet is included with the number of timer values indicating the number of packets which have already been transmitted and the timeout interval thereof has not expired yet. Afterwards, the step of determining the timer value indicating the minimum timeout interval is performed again.

The same is true if the receipt of one packet is acknowledged or after the timeout interval associated to one packet has expired and the assigned timer value is deleted from the number of timer values. After deleting the assigned timer value, the determining of the timer value indicating the minimum timeout interval to expire is performed again.

According to another embodiment of the present invention, the timer values are stored in a memory, the memory having memory positions to store the timer values. If the timer value is to be included, one of the memory positions in which no timer value is stored is selected and the timer value to be included is stored therein.

Advantageously, before the storing of the timer value to be included, the timer value can be compressed. The compression can be carried out by the steps of classifying the timer value in one of a number of predetermined time periods defining predetermined ranges of timeout intervals, of rounding the timer value by cutting one or more least significant bits depending on the one predetermined time period classified and/or cutting one or more most significant bits if these are not used for representing the timer value and of appending one or more period identifier bits to the rounded timer value to obtain the compressed timer value.

This method has the advantage that timer values can be stored in a space-saving manner so that memory can be saved or a smaller timer value memory can be used. The compression method is based on the effect that the larger the timeout interval is, the less important are the least significant bits of the timer value. Predefining the omitted least significant bits leads to a error in a range of only a few percent which is not affecting the timer management of data packets being transmitted, i.e. the use of timeout intervals for timeout handling.

It can be provided that after expiring of the timeout interval, a unique packet identifier of the packet associated to the determined timer value is provided, e.g. to a packet transmission unit e.g. to invoke a special handling as no receipt of a transmitted packet has been acknowledged during the timeout interval.

In an advantageous embodiment, the timer value sets are structured as heaps and/or sub-heaps each having the predetermined number of timer values therein. Heaps represent a well-known data structure as known from the heap sort algorithm according to Ako, Hoproft, Ullman, and are appropriate to be a subject of a routine for determining the minimum timer value out of the elements of the heaps. The heaps and sub-heaps are linked so that each minimum timer value of each timer value set in one stage is included in one or more heaps of the minimum timer value sets of one or more following stages.

The present invention also provides an element processing system for detecting a timeout of elements being processed. The element processing system includes a processing unit for processing elements and for assigning a timer value indicating a timeout interval to each of the elements when processed and a time managing controller for determining the timer value indicating the overall minimum timeout interval to expire out of the number of timer values assigned to the number of packets being processed. The element processing system further comprises a timer unit for receiving a provided overall minimum timer value and for detecting if the provided timer value has expired to detect the timeout of the assigned packet. Furthermore, a timer value memory for storing timer values assigned to the elements being processed is provided. The time managing controller includes several stages which are cascadingly arranged, thereby having a first, preceding and a last, succeeding stage. First timer value manager unit arranged as the first stage of the time managing controller is provided which comprises a first means for dividing the number of timer values up into timer value sets, each containing a number of timer values and first means for determining a timer value having a minimum timeout interval of any of the timer values, for each of the timer value sets, and for providing the determined timer values of each of the timer value sets to the following stage of the time managing controller. Furthermore, a second timer value manager unit is provided which is arranged as the last stage of the time managing controller and which comprises a second means for determining the overall timer value from the timer values provided by the preceding stage having the minimum timeout interval of any of the provided timer values and for providing the overall timer value to the timer unit.

The element processing system allows a faster timer management by providing several stages of the time-managing controller which are cascadingly arranged to implement a faster system for performing the determining of the timer value having the minimum timeout interval.

According to another embodiment of the present invention, a element processing system is provided wherein the time-managing controller further comprises one or more third timer value manager units, each arranged as one intermediate stage respectively, comprising a third means for dividing up the number of timer values provided from the succeeding intermediate or first stage into respective timer value sets each containing a number of timer values and third means for determining the respective minimum timer value having the minimum timeout interval of any of the respective timer values for each of the respective timer value sets and for providing the respective minimum timer values of each of the respective timer value sets to the next intermediate or last stage.

Thereby, the cascade of stages can be optimized by predetermining the number of timer values included in a timer value set and thereby defining the number of stages necessary for a given maximum number of data packet sent out.

Furthermore, it can be provided that the elements are data packets and the element processing system is a packet-based transmission system, wherein the processing unit is designed as a transmission unit for sending out data packets and for assigning the timer value for each of the data packets when transmitted.

It can be provided that the transmission unit provides the timer value of the specific data packet when being transmitted to the time managing controller wherein the time managing controller includes the timer value assigned to the data packet to the timer value memory storing the number of packets which have already been transmitted and the timeout interval thereof not having expired and determines the timer value indicating the overall minimum timeout interval to expire out of the number of timer values.

The transmission unit can be operable to delete the assigned timer value from the number of timer values in the timer value memory if a receipt of one packet is acknowledged or after the timeout interval associated to the one packet has expired. The time managing controller determines, after deleting, the timer value indicating the minimum timeout interval to expire.

Advantageously, the timer manager controller can have a compression means for compressing the timer values before being stored in the timer value memory wherein the timer value managing controller further includes classifying means for classifying the timer value in one of a number of predetermined time periods defining predetermined ranges of timeout, rounding means for rounding the timer value by cutting one or more least significant bits depending on the one predetermined time period classified and/or cutting one or more most significant bits if these are not used for representing the timer value, and appending means for appending one or more period identifier bits to the rounded timer value to obtain the compressed timer value.

According to another embodiment, the time managing controller is designed to provide a unique packet identifier of the packet associated to the determined timer value after expiring the timeout interval.

In FIG. 1, an advantageous embodiment of a packet-based transmission system is depicted. It comprises a general purpose processor 1 which is connected via a network connection to a network (not shown) for transmitting data packets by means of a packet-based transmission protocol, such as TCP or SCTP. The general purpose processor 1 includes standard units such as a central processing unit (CPU) 2, a memory manager unit (MMU) 3, an instruction cache 4 and a data cache 5, each connected to an interconnection bus 6, and an auxiliary processing unit (APU, internal co-processor) 8.

The general purpose processor 1 is connected to a timer manager 10, which is responsible for handling timeout intervals associated to each of the packets transmitted by the general purpose processor 1 to the network. The timer manager can be implemented in a standard external co-processor device or in a customized device. The timer manager 10 can also be implemented in the general purpose processor 1. The timeout intervals of the packets being transmitted may indicate a time after which a retransmission is performed by the general purpose processor 1, if no receipt of the respective packet has been acknowledged. Instead of a retransmission of the packet, other error (or exception) handling procedures can be carried out. The timer manager unit 10 receives commands from the general purpose processor to set a timer when a data packet has been transmitted and to clear a timer, i.e. to delete the respective timer value, if a receipt of the data packet has been acknowledged. Furthermore, the timer manager unit communicates with the general purpose processor 1 if the timeout interval expires before the receipt has been acknowledged so that a special handling, e.g. a retransmission is invoked.

The timer manager 10 is also connected to the interconnection bus 6 and therefore has access to a main memory unit 11 in which timer values are stored indicating respective timeout intervals of each of the packets being transmitted and of which the timeout interval has not expired and no receipt has been acknowledged yet. Each of the timer values is associated to a respective packet which can be identified by a unique packet identifier which may also be included in a receipt of transmission signal by which the receipt of a respective data packet can be acknowledged.

The main memory unit 11 can be a memory used for data and instructions or can be a specialized memory only used for storing timer values and the respective unique packet identifier information. According to one embodiment, the memory position in the main memory can be used as the unique packet identifier so that the address wherein the timer value is stored indicates the respective data packet being transmitted. The timer manager unit 10 comprises a time base unit 12 providing a time base related to the timer values indicating the timeout intervals.

The timer manager unit 10 further comprises a first stage controller 13, a second stage controller 14 and a third stage controller 15. Each of the first, second and third stage controller 13, 14, 15 comprises a respective timer memory cache which is organized in timer memory portions containing a predetermined number of timer memory cells. The third stage controller 15 comprises a third cache memory 20 wherein a number of timer values can be stored.

If a packet has been transmitted by the general purpose processor 1 via the network, a "set timer" command is transmitted to the timer manager unit 10, particularly to the third stage controller 15. The third stage controller 15 looks for a free memory position in the third cache memory 20 wherein the timer value of the packet being transmitted can be stored. As the main memory 11 is logically divided up into groups, the group containing the determined empty memory position is cached into the third cache memory 20 of the third stage controller 15. The timer value indicating the timeout interval of the packet being transmitted is now stored on the empty memory position and the third stage controller 15 determines which of the timer values stored in the cached memory group indicates the minimum timeout interval to expire. For example, this can be performed by determining the minimum timer value of all timer values stored in the memory group cached.

Figure 2:
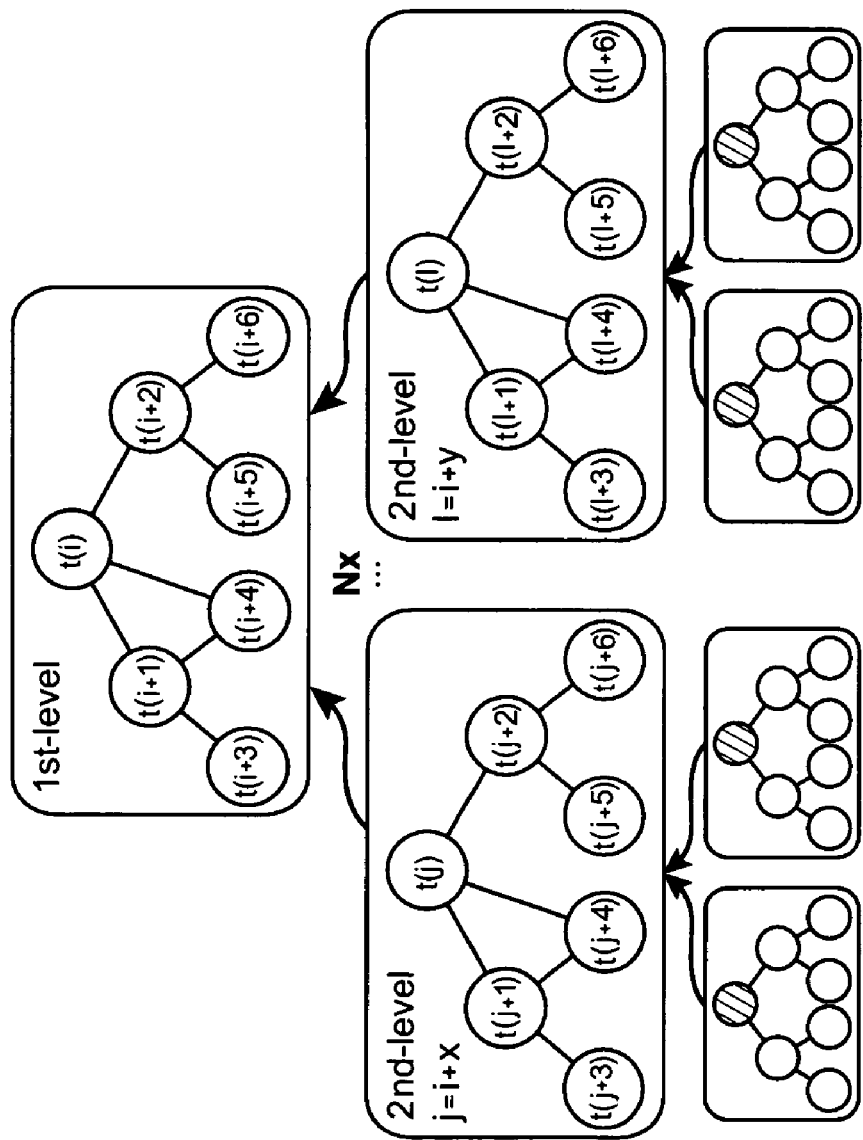
FIG. 2 a schematic diagram for illustrating the algorithm for determining the timer value having the minimum timeout interval.

For the data structure of the timer values in the first to third cache memories, a so-called d-heap can be used. The basic structure of a d-heap is a binary heap with N entries. Each of the entries represents a minimum of a subsidiary heap containing N elements, too. This is depicted in FIG. 2. Therefore, the second level consists of N sub-heaps. These again are the minimums of a following third level of sub-heaps wherein the number of the third level sub-heaps equals to the number of second level sub-heaps times the number N of elements of one second level sub-heap. An m-level d-heap having N entries per basic heap can be used to determine a minimum timer value out of a total $N^m$ elements.

For handling the different stages of heaps, the first to third stage controllers 13, 14, 15 are provided. As the memory groups of the main memory 11 are organized in groups each of them indicating one sub-heap, a third level controller determines for all of the memory groups the respective timer values indicating the minimum timeout interval by means of the third level cache memory, respectively. Each of the determined timer values then represents one element of a second level sub-heap 21 (as the second cache memory) which is further processed by the second stage controller 14. Depending on the number of elements in each second level sub-heap 21, the number of second level sub-heaps 21 is provided. For each of the second level sub-heaps 21 the second stage controller 14 determines a timer value indicating the minimum timeout interval and provides the determined timer value to the first level heap 22 which is controlled by the first stage controller 13.

The first level heap 22 is a single heap and is accessed by the first stage controller 13. The first stage controller 13 determines the minimum of the timer values in the first level heap so that the overall minimum timer value can be determined. The overall minimum timer value is compared to the time base value provided by the time base unit 12 and a timeout indication signal is sent to the general purpose processor 1 if the overall minimum timer value has been reached, i.e. the timeout interval has expired. In order to compare the timer value with the time base value, a timer value comparator 16 is provided.

By using the heap structure, each of the elements of the heap has its representation in a memory position in the main memory 11. Therefore, the heap structure does not need to save any pointing elements with its entries as a heap can be linearly mapped without pointers. If the parent note has the index i, its children are placed at 2i and 2i+1 (i represents also a memory address). In the structure, wherein each parent node has a number k of children nodes, the content of the children nodes is placed at k*i . . . k*i+k−1. As no pointers are used, a lot of memory and chip area can be saved.

The amount of on-chip memory can be bounded even for a latch timer array which makes the d-heap structure very suitable for a hardware implementation. A hardware design might implement, as shown in FIG. 1, a three-level d-heap. Therefore, the third level of sub-heaps contains all the timer values and they are stored in the external main memory 11. Each entry in the main memory consists of the timer value and the unique packet identifier. To avoid that each operation using a d-heap structure accesses the external main memory 11, the third stage controller 15 is connected to the third level cache 20 in which a single third level sub-heap 20 can be stored.

Inserting a new timer value can be performed in the memory positions represented by the third level sub-heap currently cached. The timer values stored in the main memory 11 are not sorted, but when the timer values of one memory group of the main memory 11 are loaded into the third level cache 20, the determining of the timer value indicating the minimum timeout interval is performed on the fly and the timer value is provided to the node of the second level sub-heap 21 corresponding to the respective memory group.

Every time the second level sub-heap 21 receives a new timer value, the determining of the minimum timer value is performed by the second stage controller 14. If then a new minimum timer value of the respective second level sub-heap 21 is determined, the new minimum timer value is provided to the first stage controller 13 which carries out a determining of the minimum timer value in the first level heap 22.

To avoid a transmission of the timer values between the second level sub-heap 21 and the first level heap 22, one node of each of the second level sub-heaps containing the respective minimum timer value of all elements of one in the second level sub-heaps 21 corresponds to the respective node of the first level heap 22. Consequently, the first stage controller 13 will perform the determination of the minimum timer value only if one of the nodes of the first level heap 22 has changed.

As a new timer value is written into the third level cache 20, the number of memory accesses is essentially decreased. One advantage of the packet-based transmission system lies in the decreased number of memory accesses as only the current timer value indicating the minimum timeout interval to expire are loaded and are processed. Therefore, only a reduced number of timer values is handled at the same time, so that the processing time can be saved and the overall timer management can be optimized.

The number of stages included between the third stage controller 15 and the first stage controller 13 can be substantially freely selected as well as the number of nodes (elements) for each of the heaps and sub-heaps. The number of stages and the number of nodes of each heap determines the overall number of data packets which can be controlled by a respective timer and of which the timeout interval has not expired yet and no receipt of transmission has been acknowledged yet.

Figure 3:
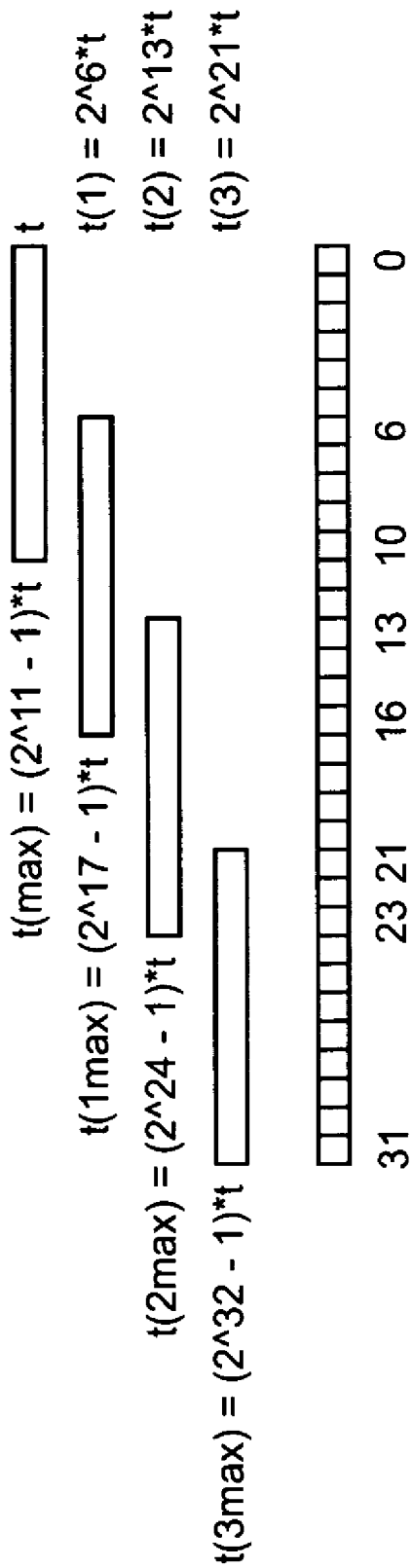
FIG. 3 a schematic diagram for illustrating the timer value ranges for use in a compression method according to the present invention.

To save memory when storing the timer values, the timer values can be compressed in a timer value compression unit which is included in the third level controller 15. A 32 bit timer, which counts with a rate of 1 ms has a period of approximately 50 days. Thus, the resolution might be variable according to the timer value. The timer values can be compressed so that they can be stored by a number of bits smaller than 32, e.g. 11 bits. As shown in FIG. 3, the total range of 32 bit can be divided up into four ranges for time periods, each of them having the size of 11 bits, as an example. The first range is determined by the bits 0 to 10, the second range is determined by the bits 6 to 16, the third range is determined by the bits 13 to 23, and the fourth range is determined by the bits 21 to 31.

Figure 4:
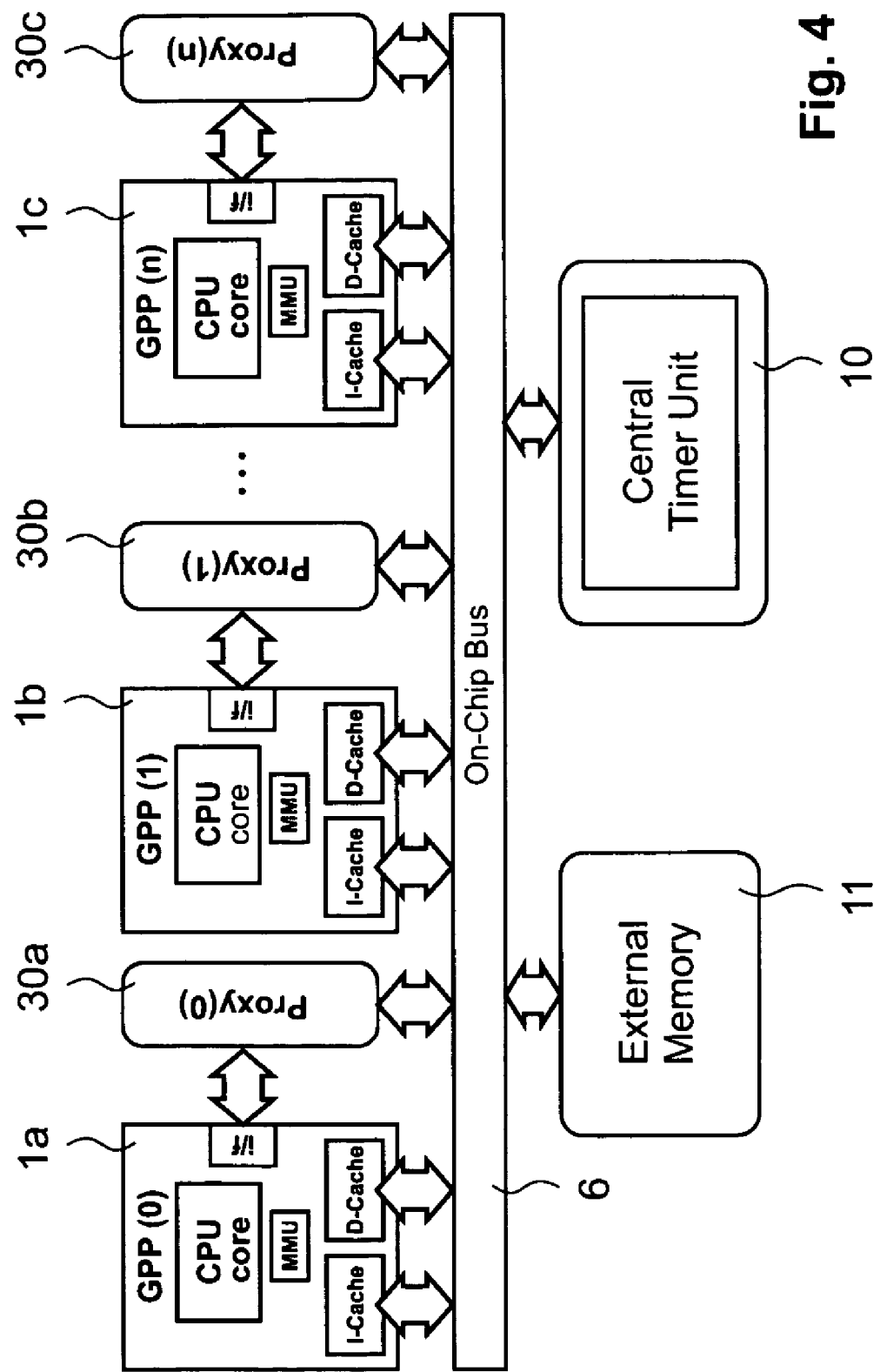
FIG. 4 another embodiment of a packet-based transmission system.

Each of the timer values to be stored is compared to the boundaries of the first to fourth ranges and is associated to the respective range wherein it lies. If the timer value lies below the upper boundary of the first range, the most significant bits 11 to 31 are cancelled and the timer value is stored, wherein only the bits 0 to 10 of the uncompressed timer value are stored as the bits 11 to 31 contain a "0". If a timer value lies between the upper boundary of the second range and the upper boundary of the first range, the least significant bits 0 to 5 and the most significant bits 17 to 31 are cancelled. Only the bits 6 to 16 are stored, representing the timer value. If the uncompressed timer value lies between the upper boundary of the third range and the upper boundary of the second range, it is stored as the bits 13 to 23, wherein the least significant bits 0 to 12 and the most significant bits 24 to 31 are cancelled. If the timer value lies between the upper boundary of the fourth range and the upper boundary of the third range, the least significant bits 0 to 20 are deleted and only the bits 21 to 31 are stored. To indicate to which of the ranges the stored compressed timer value belongs, two additional range identifier bits are appended to the compressed timer value. Advantageously, the range identifier bits are appended as the most significant bits, wherein the higher the range, the higher the value of the range identifier bits. In the above-mentioned case, four ranges can be identified by two range identifier bits. Therefore, the timer value can be stored using 13 bits instead of 32 bits. The maximum error by rounding to a specific range can be regarded as negligible. The maximum errors of the above-given example are as follows:

1. $E0 = 0\%$
2. $E1 = (2^6-1)/(2^{11}+2^6-1) \sim 2^{-5} = 3.13\%$
3. $E2 = (2^{13}-1)/(2^{17}+2^{13}-1) \sim 2^{-4} = 6.25\%$
4. $E3 = (2^{21}-1)/(2^{24}+2^{21}-1) \sim 2^{-3} = 12.5\%$ Even though the time managing unit 10 is intended to be tightly coupled to the general purpose processor 1, other coupling variations can be applied. This is shown, for example, in the embodiment of FIG. 4. The time managing unit 10 can also be implemented as separated device or in a system-on-chip environment wherein multiple clients request to access the time managing unit 10, e.g. in a multi-processor environment. A central time managing unit 10 can then be accessed by its clients (general purpose processors $1a$, $1b$ ... $1c$) via associated proxy devices ($30a$, $30b$, $30c$) to reduce access latency into assure data coherence.

As an alternative embodiment, the time managing unit 10 is not directly coupled to the general purpose processor but via the interconnection bus 6.

According to another embodiment of the present invention includes several timer units which are associated to a general purpose processor are connected to a bus system. A central timer for coordination between the distributed timer units is also connected to the bus.

In one embodiment of the present invention, the heaps and/or the sub-heaps can be implemented as a CAM memory (content addressable memory), wherein it can be detected if a special content is included into the CAM memory or not. Using a CAM memory as first level heap, the time base value is provided to the CAM memory which returns an identity signal if the time base value and one of the stored elements in the CAM memory are identical. As sub-heaps, CAM memories can be provided which output the smallest stored timer value.

The foregoing embodiments are explained using a time base unit including a counter which is incremented with a special rate. Time base units can be provided as well, including decrementing counters. In this case, the first to third stage controllers 13, 14, 15 determine the maximum timer value as the maximum timer value indicates the minimum timeout interval which expires next. Instead of providing three stages for determining the minimum timeout interval to expire, two or more than three stages can be used to implement the algorithm or determine the minimum timer value.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. Methods of this invention may be implemented by an apparatus which provides the functions carrying out the steps of the methods. Apparatus and/or systems of this invention may be implemented by a method that includes steps to produce the functions of the apparatus and/or systems.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising detecting a timeout of elements in an element processing system, wherein a number n of elements are being processed; wherein a timer value, indicating a timeout interval with respect to a given time base, is assigned to each of the elements when processed; the step of detecting comprising:

determining the timer value indicating a minimum timeout interval to expire out of a number n of timer values assigned to the number n of elements being transmitted;
detecting if the determined timer value is expired to detect timeout of assigned elements;
wherein the step of determining the timer value is performed in a number of stages arranged in a cascade and having a first, preceding stage and a last, succeeding stage wherein the following steps are performed in the first stage:
dividing up the number n of timer values into timer value sets each containing a number d of timer values,
for each of the timer value sets, determining a minimum timer value having the minimum timeout interval of any of the timer values;
providing minimum timer values for each of the timer value sets to a succeeding stage; and
wherein in the last stage, the step of determining an overall minimum timer value from the minimum timer values provided to the succeeding stage is performed,
wherein at least one intermediate stage is provided comprising the steps of:
dividing up the number of provided timer values from the preceding stage into respective timer value sets each having a number of the provided timer values;
for each of the respective timer value sets, determining a respective timer value having the minimum timeout interval of any of the respective minimum timer values of the respective minimum timer value set;
providing the determined timer values of the respective stage to a succeeding stage,
wherein the elements are data packets and the element processing system is a packet-based transmission system, wherein the timer value is assigned to each of the packets when transmitted, and
further comprising
if a packet has been transmitted, including the timer value assigned to the packet to the number of timer values indicating the number of packets being already transmitted and the timeout interval thereof not being expired; and
performing the step of determining the timer value indicating the minimum timeout interval to expire; and
if receipt of a packet is acknowledged or after the timeout interval associated to the packet is expired, deleting the assigned timer value from the number of timer values; and
performing the step of determining the timer value indicating the minimum timeout interval to expire,
wherein:
the timer values are stored in a memory, the memory having memory positions to store timer values, wherein if a timer value is to be included, one of the memory positions in which no timer value is stored, is selected and the timer value to be included is stored therein,
before storing the timer value to be included, the timer values are compressed by performing the following steps:
classifying the timer value in one of a number of predetermined time periods defining predetermined ranges of timeout,
rounding the timer value by cutting one or more least significant bits depending on a predetermined time period classified and/or cutting one or more most significant bits if these are not used for representing the timer value, and appending one or more period identifier bits to the rounded timer value to obtain the compressed timer value, a special handling is invoked if no receipt related to the respective packet has been acknowledged during the timeout interval;

wherein after expiring of the timeout interval a unique packet identifier of the packet associated to the determined timer value is provided, the timer value sets and/or the minimum timer value sets are structured as heaps and/or sub-heaps each having a predetermined number of timer values, each minimum timer value of each timer value set is included in one or more heaps of the minimum timer value sets.

* * * * *